United States Patent
Moolla

(10) Patent No.: US 10,229,442 B1
(45) Date of Patent: Mar. 12, 2019

(54) CUSTOMER EMOTIONAL STATE ANALYSIS FOR OPTIMIZED FINANCIAL TRANSACTIONS

(71) Applicant: Wells Fargo Bank, N.A., Charlotte, NC (US)

(72) Inventor: Roohi Moolla, Tiburon, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 579 days.

(21) Appl. No.: 14/972,998

(22) Filed: Dec. 17, 2015

(51) Int. Cl.
  *G06Q 30/00* (2012.01)
  *G06Q 30/06* (2012.01)
  *G06Q 30/02* (2012.01)
  *G06N 99/00* (2019.01)

(52) U.S. Cl.
  CPC ....... *G06Q 30/0611* (2013.01); *G06N 99/005* (2013.01); *G06Q 30/0204* (2013.01)

(58) Field of Classification Search
  CPC .......................................... G06Q 30/06–30/08
  USPC .............................................. 705/26.1–27.2
  See application file for complete search history.

(56) References Cited

U.S. PATENT DOCUMENTS

| | | |
|---|---|---|
| 8,290,951 B1 | 10/2012 | Joa et al. |
| 8,849,826 B2 | 9/2014 | Minh |
| 2010/0119053 A1 | 5/2010 | Goeldi |
| 2011/0178910 A1 | 7/2011 | Benefield et al. |
| 2011/0276513 A1 | 11/2011 | Erhart et al. |
| 2012/0233258 A1 | 9/2012 | Vihayaraghavan et al. |
| 2012/0317038 A1 | 12/2012 | Erbey et al. |
| 2013/0018838 A1 | 1/2013 | Parnaby et al. |
| 2013/0073336 A1 | 3/2013 | Heath |
| 2013/0231974 A1 | 9/2013 | Harris et al. |
| 2013/0291098 A1 | 10/2013 | Chung et al. |
| 2014/0006601 A1 | 1/2014 | Agarwal et al. |
| 2014/0032475 A1 | 1/2014 | Evans et al. |

(Continued)

OTHER PUBLICATIONS

Jieun Kim, Yongtae Park, Chulhyun Kim & Moon-Soo Kim, Importance-Performance Analysis (IPA) for Technology-based Service Sentiment Analysis Using User Review, International Conference on Information, Business and Education Technology, 2013, 700-703, Atlantis Press.

*Primary Examiner* — Ethan D Civan
(74) *Attorney, Agent, or Firm* — Walter Haverfield LLP; James J. Pingor

(57) ABSTRACT

The innovation disclosed and claimed herein, in one aspect thereof, comprises systems and methods for optimized communications based on a customer emotional state. In aspects of the system and method, a customer social media account is analyzed for past social media posts. Customer emotional states are determined for the past social media posts. The past social media posts are also associated with financial transactions made by the customer such that emotional states are linked to specific financial transactions. The system and method monitor the customer social media account for new social media posts. A new social media post can be detected. An emotional state can be determined for the new social media post. The system and method collect the financial transactions with the same emotional state. The system and method generate an offer for similar products and/or related to the financial transactions. The offer is communicated to the customer.

16 Claims, 6 Drawing Sheets

(56) References Cited

U.S. PATENT DOCUMENTS

2014/0074589 A1\* 3/2014 Nielsen .............. G06Q 30/0271
                                                      705/14.43
2014/0287387 A1   9/2014 Vukasinovic
2015/0066764 A1   3/2015 Crowell et al.
2015/0213002 A1\* 7/2015 Gou .................... G06F 17/2785
                                                      704/9

\* cited by examiner

CUSTOMER EMOTIONAL STATE ANALYSIS FOR OPTIMIZED FINANCIAL TRANSACTIONS

BACKGROUND

Customers receive a large number of offers and/or advertisements such that customers generally ignore, or do not pay enough attention to the offers and/or advertisements (simply referred to as offers). The offers are often generic in nature and do not address the customer's specific needs at the time. Further, the offers can be ignored due to the customer's present mood. Financial institutions and other offer providers waste resources generating and sending the offers that customers will most likely ignore due to their emotional state.

BRIEF DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods for optimized communications based on a customer emotional state. In aspects of the innovation, a customer social media account is analyzed for past social media posts. Customer emotional states are determined for the past social media posts. The past social media posts are also associated with financial transactions made by the customer such that emotional states are linked to specific financial transactions. The innovation monitors the customer social media account for new social media posts. A new social media post can be detected and an emotional state can be determined for the new social media post. The innovation collects the financial transactions with the same or similar emotional state. The innovation generates an offer for similar products and/or related to the financial transactions. The offer is communicated to the customer.

In aspects, the subject innovation provides substantial benefits in terms of tailoring offers and/or advertisements for the individual customer. Further, there is a benefit in increasing the likelihood of a response to the offer using knowledge of customer's emotional state. These and other benefits of the innovation will be better understood upon a review of the detailed description infra.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Figure 1:
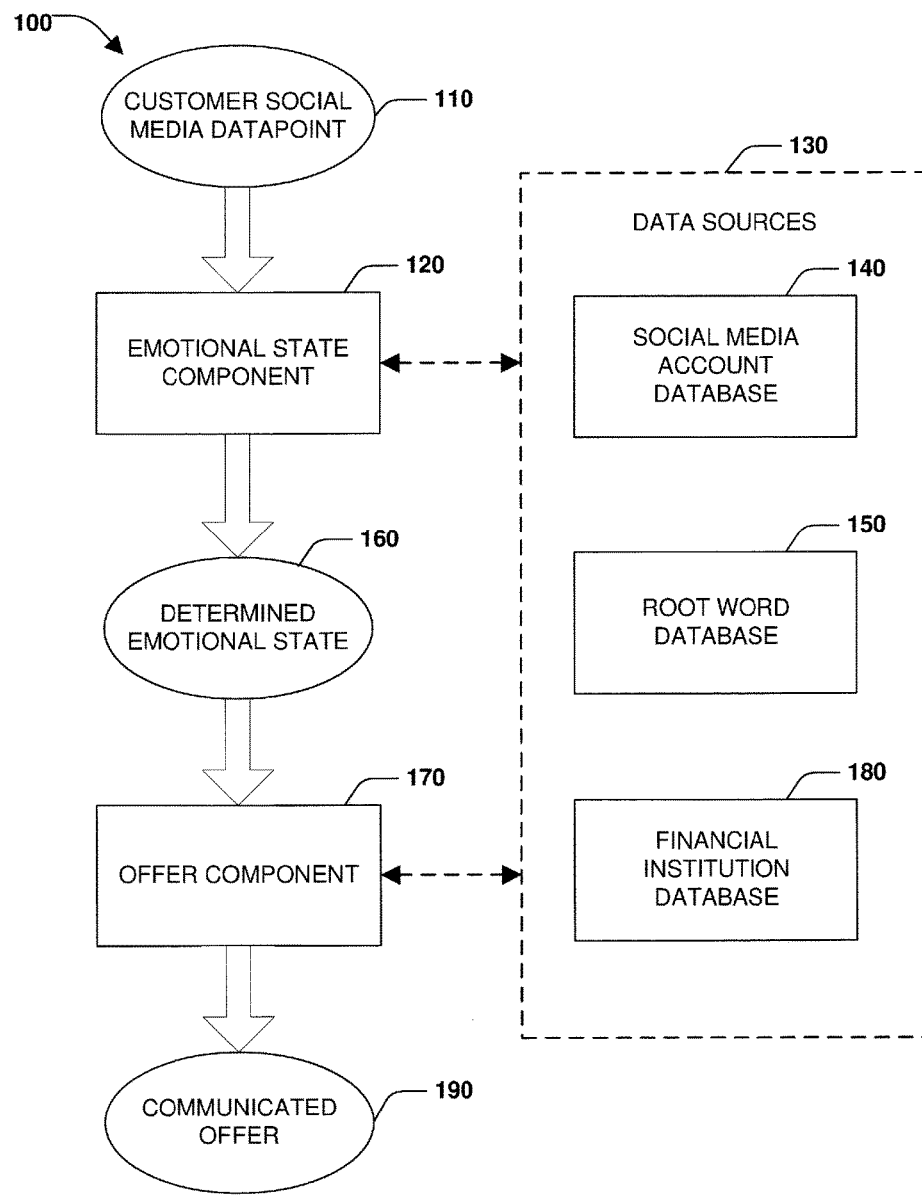
FIG. 1 illustrates an example input/output diagram for customer emotional state analysis for optimized financial communications.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers or special-purpose machines.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

With reference to FIG. 1, an example input/output diagram 100 for generating offers based on a customer emotional state is depicted. A customer social media datapoint 110 is detected by an emotional state component 120. The customer social media datapoint 110 can be data shared by the customer to a social media website or social media platform. For example, a social media datapoint 110 can be a post to a customer's Facebook account and/or wall. The social media website may be any communication shared by the customer that is for consumption by family members, friends, and/or aquantinces of the customer. In some cases, the communication shared may be viewable by anyone (e.g., the general public).

In the situation where the communications is posted to the social media website or social media platform and is viewable by anyone (e.g., not password protected or restistrited from viewing), the communications may be collected by monitoring the sites. In cases where the communication is protected through various forms of security (e.g., password protected), the customer may have provided prior authorization for the collection of communications in order to facilitate data collection as described herein. The social media communications may be linked to the customer based on email alias information, phone number information, internet protocol address, or other manners of identifying a source of electronic communication.

It is noted that in accordance with one or more implementations described in this disclosure, users may opt-out of providing personal information, demographic information, location information, proprietary information, sensitive information, social communication information, or the like in connection with data gathering aspects. Moreover, one or more implementations described herein may provide for anonymizing collected, received, and/or transmitted data. Further, a user may opt-out of providing information at any time, regardless of whether the user previously opted-in to providing the information.

The emotional state component 120 monitors the customer's social media account for new social media datapoints 110. The emotional state component 120 determines the customer's emotional state based on one or more of the social media datapoints 110. The emotional state component 120 can determine the emotional state using implicit and/or explicit means. For implicit determination of the emotional state, in one embodiment, the emotional state component 120 can use machine learning or historical analysis and/or algorithms to make the determination. The emotional state component 120 accesses data sources 130 to determine the emotional state of the social media datapoint 110.

In one embodiment, the emotional state component 120 utilizes machine learning of historical data to facilitate emotional state determination. The data sources 130 can include a social media account database 140. The social media account database 140 includes previous social media datapoints. The social media account database 140 includes further information about the social media datapoints. The information can include time, location, person tags, business tags, hashtags, or the like.

The emotional state component 120 analyzes the social media account database for content to match with a root word database 150. The root word database 150 is a collection of trigger words indicative of a specific emotional state of the customer. For example, a trigger word may be happy, sad, angry, or the like. The emotional state component 120 parses a social media datapoint for root words. The emotional state component 120 matches a trigger word in the root word dictionary 150. The root words in the root word dictionary 150 are each associated with corresponding emotional states. The emotional state component 120 associates the social media datapoint having the trigger word with the customer emotional state associated with the trigger word found in the root word dictionary 150. For example, a social media datapoint includes the word "exam." Exam is matched in the root word dictionary 150 and is determined to be associated with apprehension. In another embodiment, the social media datapoint include a separate emotional state tag. For example, Customer A may post "Customer A is feeling angry" where "angry" is selected from suggested emotions for Customer A to explicitly convey in the social media datapoint.

The emotional state component 120 can provide a determined emotional state 160 for the detected customer social media datapoint 110 to an offer component 170. The offer component 170 matches the determined emotional state 160 of the social media datapoint 110 to an offer. The offer component 170 can utilize machine learning and/or historical analysis or the like to determine an offer best suited to convey to the customer.

The offer component 170 analyzes the social media account database 140 in view of a financial institution database 180. The financial institution database 180 includes financial transactions of an account associated with the customer. The financial institution database 180 includes information about the financial transactions. The information can include type of transaction, items purchased, an offer associated with the transaction, transaction time, and the like.

In one embodiment, the offer component 170 matches a social media datapoint to a financial transaction. The social media datapoint is matched temporally to a financial transaction. The offer component 170 associates the social media datapoint with the financial transaction such that the datapoint is assumed to be a factor in causing the financial transaction or vice versa.

In one embodiment, the offer component 170 determines a time of a financial transaction. The offer component 170 searches social media datapoints on the social media account database 140 that are within a frame of the time of the financial transaction. The offer component 170 finds a social media datapoint having at least one trigger word in the root word database 150. The offer component 170 associates the social media datapoint with the financial transaction.

The offer component 170 generates an offer to communicate to the customer based on the previous financial transactions associated with social media datapoint emotional states. For example, a customer has previously purchased ice cream after posting a social media data with a determined emotional state of sadness. Upon determination of a new social media datapoint with a sadness emotional state, the offer component 170 generates an offer for ice cream coupons or other ice cream products and/or products associated with a previous purchase. The offer component 170 communicates the offer 190 to the customer. The communication can be made over email, text message, API notification through social media or mobile phone application or the like.

Figure 2:
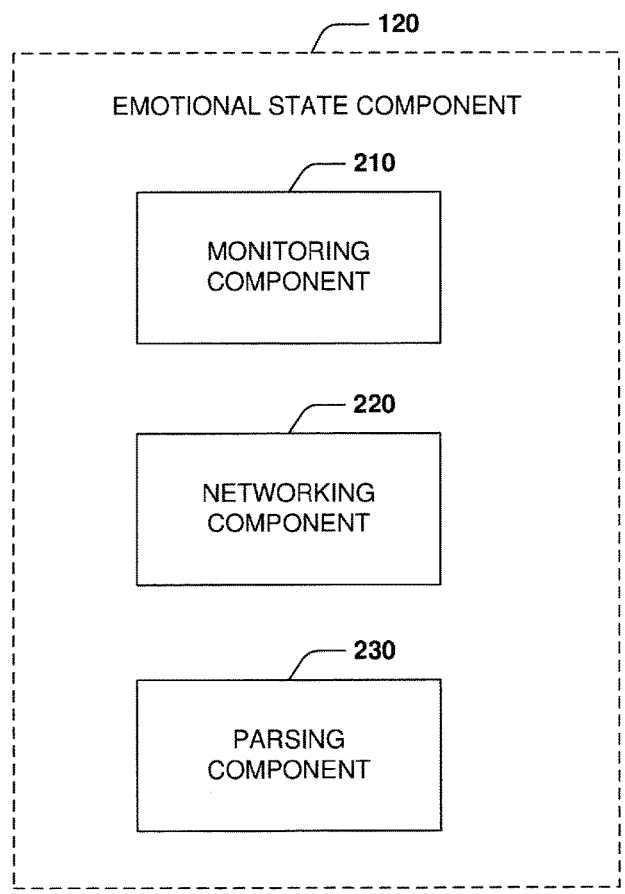
FIG. 2 illustrates an example component diagram of an emotional state component.

With reference to FIG. 2, and continuing reference to FIG. 1, a component diagram of the emotional state component 120 is depicted. The emotional state component 120 includes a monitoring component 210. The monitoring component 210 continuously checks the social media account database 140 to detect new social media datapoints.

The new social media datapoints may be for a specific customer or across a set of customers. For example, details related to an inferred emotional state of a customer and an associated financial transaction may be observed and retained in a database. In another example, details related to an inferred emotional state of another customer and its associated financial transaction may be observed and retained in the database (or in another database). Thus, if an inferred emotional state of one customer does not have an associated financial transaction, then patterns observed for other customers may be utilized to tailor an offer and/or advertisement for the one customer. The patterns of other customers may be utilized if the patterns match across a threshold level of customers (e.g., more than 60% of customers purchase ice cream when their inferred emotional state is "stressed.").

The emotional state component 120 includes a networking component 220. The networking component can connect to a mobile network, wired LAN, wireless LAN, an internet network, or the like to transmit communications. The networking component 220 connects to a transmission server to send and receive communications, alerts, or the like to and from a user device. The mode of the communication can be text, SMS, email, push notification via an API interface, or the like. The user device installs an application such that the communications activate the application on the user device when the transmission server sends a communication to the user device.

The emotional state component 120 includes a parsing component 230. The parsing component 230 analyzes social media datapoints on word by word or phrase level. The parsing component 230 separates out trigger words for matching with entries in the root word database 150, as described above.

Figure 3:
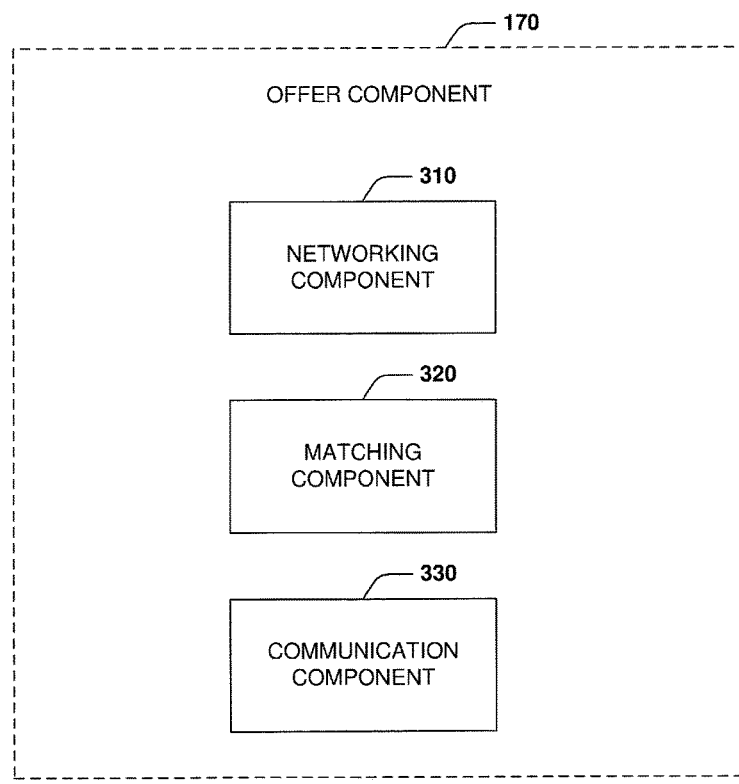
FIG. 3 illustrates an example component diagram of an offer component.

With reference to FIG. 3, and continuing reference to FIG. 1, a component diagram of the offer component 170 is depicted. The offer component 170 includes a networking component 310. The networking component can connect to a mobile network, wired LAN, wireless LAN, an internet network, or the like to transmit communications. The networking component 310 connects to a transmission server to send and receive communications, alerts, or the like to and from a user device. The mode of the communication can be text, SMS, email, push notification via an API interface, or the like. The user device installs an application such that the communications activate the application on the user device when the transmission server sends a communication to the user device. The networking component 310 is in communication with the purchase system 120 to send and receive information, commands, actions, or the like.

The offer component 170 includes a matching component 320. The matching component 320 receives a determined emotional state from the emotional state component 120. The matching component 320 associates the determined emotional state with an offer based on previous financial transactions completed by the customer.

The offer component 170 includes a communication component 330. The communication component 330 receives the offer from the matching component. The communication component 330 sends the offer to the customer via the networking component 310. The communication component 330 determines a communication mode with which to interact with the customer. In one embodiment, the communication component 330 accesses a user profile to determine a communication mode preference. The communication mode can be social media post, advertisement, text message, API notification, email, or the like.

Figure 4:
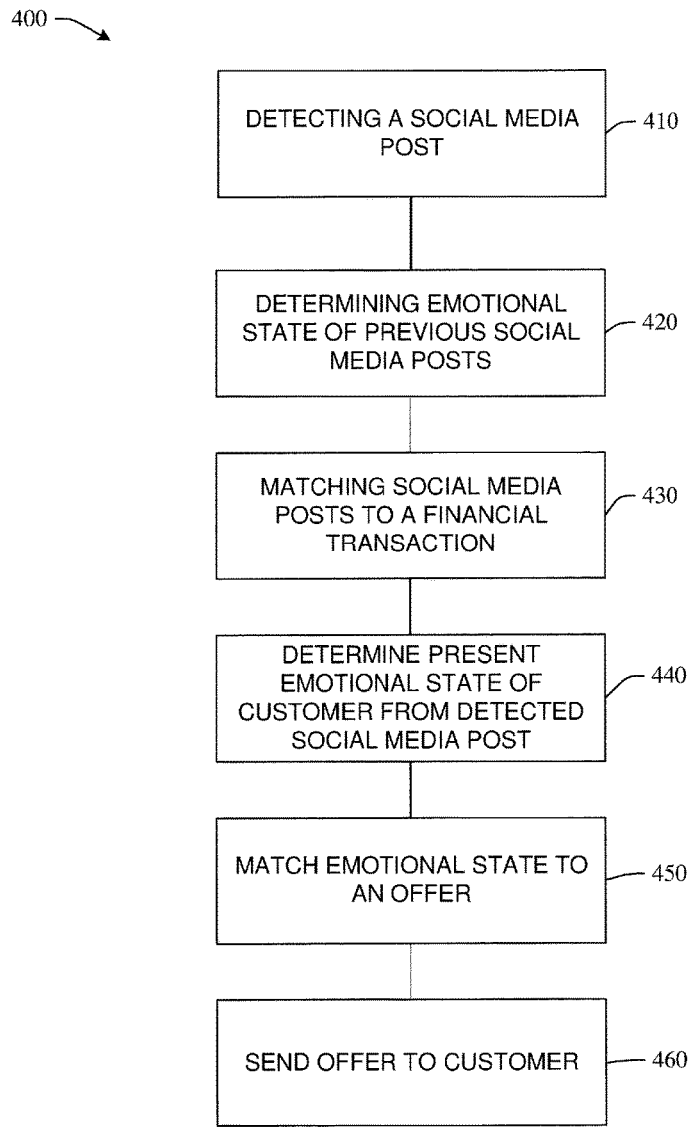
FIG. 4 illustrates a flowchart for customer emotional state analysis.

With reference to FIG. 4, an example method 400 is depicted for authenticating a customer of a financial institution. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. It is also appreciated that the method 400 is described in conjunction with a specific example is for explanation purposes.

In aspects, method 400 can begin at 410 by detecting a social media post. For example, a customer writes a new post to their Facebook account. At 420, previous social media posts are analyzed for emotional states, e.g. emotional indicators. The historical social media posts are parsed for words indicative of a discreet emotional state. Continuing the example, the content of the Facebook posts, e.g. text, tags, or the like, is extracted and analyzed, e.g. the Facebook post "I have a test next week." is parsed and the emotional state is determined to be "stressed" or "apprehension."

At 430, the previous social media posts are matched to a financial transaction. The posts are matched to the financial transaction using a time frame such that the posts and the transaction are relatively close together temporally. The temporal relationship assumes a cause/effect relationship between the two. In one embodiment, a database can be built with financial transactions matched to social media posts and customer emotional states. In the example, timestamps of the Facebook posts are matched to timestamps of financial transactions of the customer, e.g. credit card transaction, online purchases, or the like. The timestamps of each can be within a certain threshold of one another. When the Facebook posts are matched to the financial transactions, the match is recorded in a database such that they are linked. The database also associates the emotional states of each Facebook post such that the emotional states are associated to a financial transaction. In the example, the timestamp of post "I have a test next week." is determined to be within a close time period of a credit card purchase of ice cream. The determined emotional state for the post, as stated above, is "stress." The database records an association between ice cream and stress for future use.

At 440, the present emotional state of the customer is determined based on the detected social media post. The detected social media post is parsed for emotional indicators to be matched to a discreet customer emotional state. In the example, the detected Facebook post states "I have a paper due tomorrow." The post is parsed and determined that the phrase paper due tomorrow is associated with stress.

At 450, the emotional state is matched to an offer. The matching can be determined using the built database associating emotional states with financial transactions specific to the customer. An offer is generated for a product similar to and/or related to a financial transaction associated with the determined emotional state of the detected social media post. In the example, the association between stress and ice cream is determined from the built database of associations. Offers for ice cream coupons are generated. At 460, the offer is communicated to the customer. The offer can be sent over a transmission server to the customer's email address, text message/SMS, mobile phone application, social media account, or the like. Finishing the example, the ice cream offer is emailed to the customer. In one embodiment, the offer is sent within a predetermined timeframe after the Facebook post such that the likelihood the customer is still in the emotional state.

Figure 5:
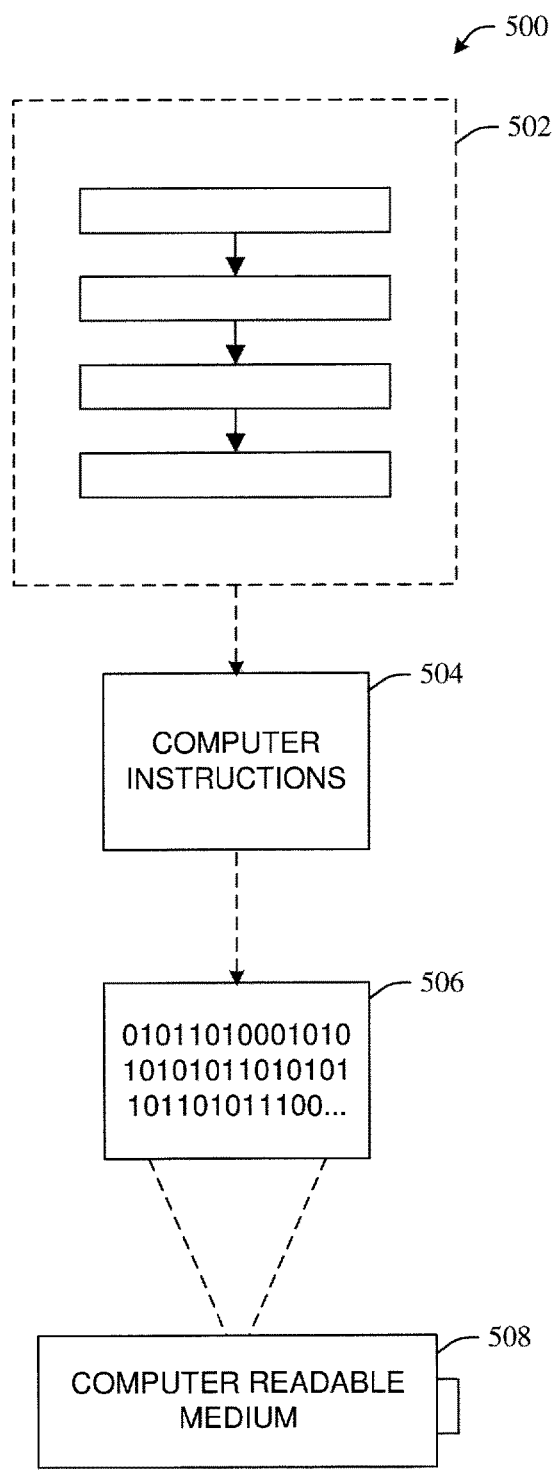
FIG. 5 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 5, wherein an implementation 500 comprises a computer-readable medium 508, such as a CD-R, DVD-R, flash drive, a platter of a hard disk drive, etc., on which is encoded computer-readable data 506. This computer-readable data 506, such as binary data comprising a plurality of zero's and one's as shown in 506, in turn comprises a set of computer instructions 504 configured to operate according to one or more of the principles set forth herein. In one such embodiment 500, the processor-executable computer instructions 504 is configured to perform a method 502, such as at least a portion of one or more of the methods described in connection with embodiments disclosed herein. In another embodiment, the processor-executable instructions 504 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 6:
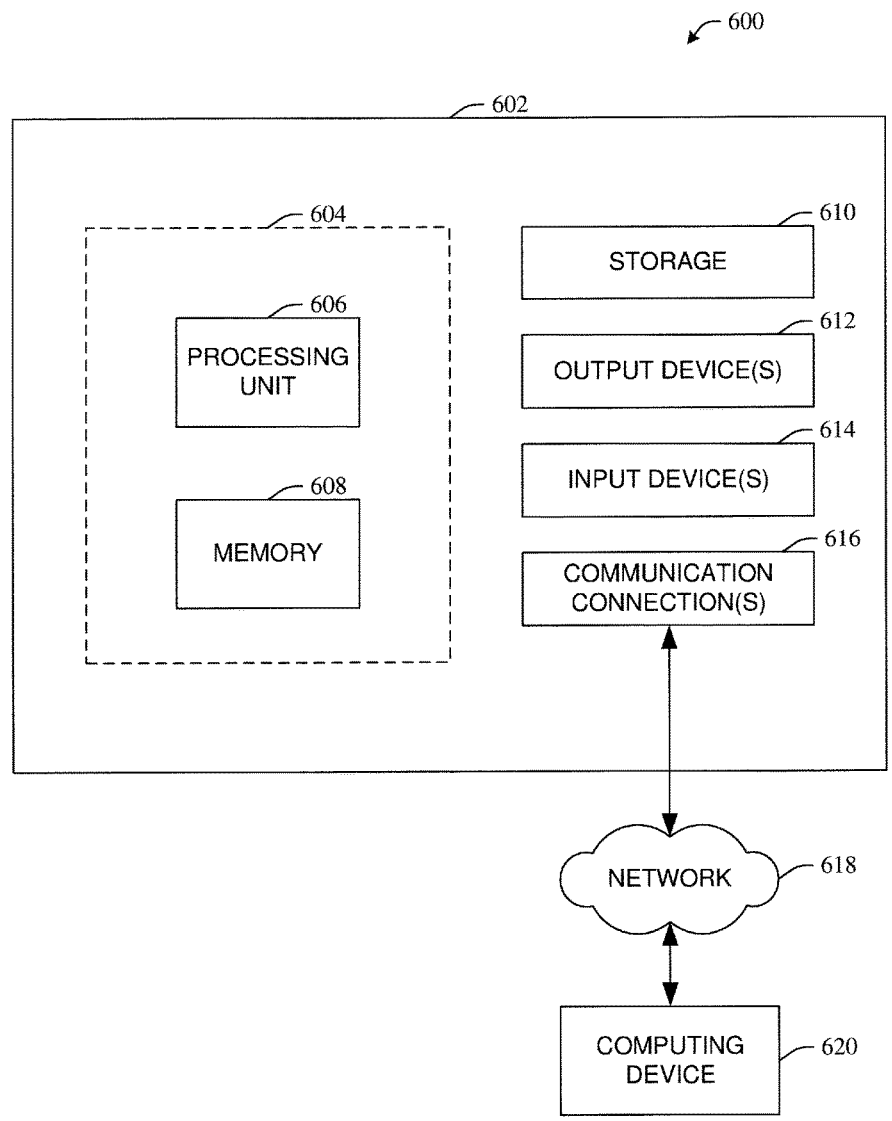
FIG. 6 illustrates a computing environment where one or more of the provisions set forth herein can be implemented, according to some embodiments.

With reference to FIG. 6 and the following discussion provide a description of a suitable computing environment in which embodiments of one or more of the provisions set forth herein can be implemented. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 6 illustrates a system 600 comprising a computing device 602 configured to implement one or more embodiments provided herein. In one configuration, computing device 602 can include at least one processing unit 606 and memory 608. Depending on the exact configuration and type of computing device, memory 608 may be volatile, such as RAM, non-volatile, such as ROM, flash memory, etc., or some combination of the two. This configuration is illustrated in FIG. 6 by dashed line 604.

In these or other embodiments, device 602 can include additional features or functionality. For example, device 602 can also include additional storage such as removable storage or non-removable storage, including, but not limited to, magnetic storage, optical storage, and the like. Such additional storage is illustrated in FIG. 6 by storage 610. In some embodiments, computer readable instructions to implement one or more embodiments provided herein are in storage 610. Storage 610 can also store other computer readable instructions to implement an operating system, an application program, and the like. Computer readable instructions can be accessed in memory 608 for execution by processing unit 606, for example.

The term "computer readable media" as used herein includes computer storage media. Computer storage media includes volatile and nonvolatile, removable and non-removable media implemented in any method or technology for storage of information such as computer readable instructions or other data. Memory 608 and storage 610 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 602. Any such computer storage media can be part of device 602.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 602 can include one or more input devices 614 such as keyboard, mouse, pen, voice input device, touch input device, infrared cameras, video input devices, or any other input device. One or more output devices 612 such as one or more displays, speakers, printers, or any other output device can also be included in device 602. The one or more input devices 614 and/or one or more output devices 612 can be connected to device 602 via a wired connection, wireless connection, or any combination thereof. In some embodiments, one or more input devices or output devices from another computing device can be used as input device(s) 614 or output device(s) 612 for computing device 602. Device 602 can also include one or more communication connections 616 that can facilitate communications with one or more other devices 620 by means of a communications network 618, which can be wired, wireless, or any combination thereof, and can include ad hoc networks, intranets, the Internet, or substantially any other communications network that can allow device 602 to communicate with at least one other computing device 620.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for generating offers based on customer emotional state, comprising:
  monitoring a social media account associated with a customer, the social media account having social media datapoints shared by the customer;
  determining an emotional state of the customer based on a social media datapoint, the determining the emotional state comprising:

analyzing a social media history of social media datapoints of the social media account;
associating a social media datapoint to a customer emotional state;
analyzing a transaction history associated with the customer, the transaction history including financial transactions and financial transaction data;
matching a financial transaction to a social media datapoint; and
associating the financial transaction with the customer emotional state; and
generating an offer based on the determined emotional state and association to the financial transaction, wherein the offer is tailored to the customer.

2. The method of claim 1, wherein associating the social media datapoint customer emotional state comprises:
accessing a root word dictionary, the root word dictionary having trigger words associated with different customer emotional states;
parsing a social media datapoint for trigger words;
searching a trigger word in the root word dictionary to find the corresponding customer emotional state; and
associating the social media datapoint having the trigger word with the customer emotional state.

3. The method of claim 1, wherein matching the financial transaction to a social media datapoint comprises:
determining a time of the financial transaction;
searching social media datapoints within a frame of the time of the financial transaction;
determining a social media datapoint having at least one emotional indicator; and
associating the social media datapoint with the financial transaction.

4. The method of claim 1, wherein generating the offer comprises:
detecting a new social media datapoint by a customer on the monitored social media account;
determining the customer emotional state of the social media datapoint; and
selecting an offer from a plurality of offers that is known to be associated with the customer emotional state and the financial transaction.

5. The method of claim 1, wherein the offer is one of a marketing communication, a product offer, or transaction offer.

6. The method of claim 1, further comprising:
providing an application to a customer device;
installing the application on the customer device; and
transmitting the offer to the customer device over a transmission server having a memory and a processor such that the application is activated on the customer device and conveys the offer to the customer.

7. The method of claim 1, wherein the social media account is one of a Facebook account, a Twitter account, or LinkedIn account.

8. The system of claim 1, wherein the social media account is one of a Facebook account, a Twitter account, or LinkedIn account.

9. A system for generating offers based on customer emotional state, comprising:
a monitoring component that monitors a social media account associated with a customer, the social media account having social media datapoints shared by the customer;
an emotional state component that determines an emotional state of the customer based on a social media datapoint, the emotional state component configured to:
analyze a social media history of social media datapoints of the social media account; and
associate a social media datapoint to a customer emotional state;
a matching component configured to:
analyze a transaction history associated with the customer, the transaction history including financial transactions and financial transaction data;
match a financial transaction to a social media datapoint; and
associate the financial transaction with the customer emotional state; and
an offer component that generates an offer based on the determined emotional state and the associated financial transaction, wherein the offer is tailored to the customer.

10. The system of claim 9, comprising:
a parsing component configured to:
access a root word dictionary, the root word dictionary having trigger words associated with different customer emotional states;
parse a social media datapoint for trigger words;
search a trigger word in the root word dictionary to find the corresponding customer emotional state; and
associate the social media datapoint having the trigger word with the customer emotional state.

11. The system of claim 9, the offer component is configured to:
determine a time of the financial transaction;
search social media datapoints within a frame of the time of the financial transaction;
determine a social media datapoint having at least one emotional indicator; and
associate the social media datapoint with the financial transaction.

12. The system of claim 11, comprising:
the emotional state component is configured to:
detect a new social media datapoint by a customer on the monitored social media account; and
determine the customer emotional state of the social media datapoint; and
the offer component is configured to select an offer from a plurality of offers that is known to be associated with the customer emotional state and the financial transaction.

13. The system of claim 9, wherein the offer is one of a marketing communication, a product offer, or a transaction offer.

14. The system of claim 9, comprising:
a communication component configured to:
provide an application to a customer device;
install the application on the customer device;
transmit the offer to the customer device over a transmission server having a memory and a processor such that the application is activated on the customer device and conveys the offer to the customer.

15. A non-transitory computer readable medium having instructions to control one or more processors configured to:
monitor a social media account associated with a customer, the social media account having social media datapoints shared by the customer;
analyze a transaction history associated with the customer, the transaction history including financial transactions and financial transaction data;
match a financial transaction to a social media datapoint;
associate the financial transaction with a customer emotional state; and generate an offer based on the determined emotional state and the associated financial transaction, wherein the offer is tailored to the customer.

16. The non-transitory computer readable medium of claim 15, wherein the one or more processors further configured to:
- detect a new social media datapoint by a customer on the monitored social media account;
- determine the customer emotional state of the social media datapoint;
- select an offer from a plurality of offers that is known to be associated with the customer emotional state and the financial transaction; and
- communicate the offer to the customer.

* * * * *